US012358292B2

(12) United States Patent
Ishibe et al.

(10) Patent No.: US 12,358,292 B2
(45) Date of Patent: Jul. 15, 2025

(54) MONOCHROME INKJET PRINTER

(71) Applicant: Brother Kogyo Kabushiki Kaisha, Nagoya (JP)

(72) Inventors: Akinari Ishibe, Okazaki (JP); Yoshinori Osakabe, Seto (JP)

(73) Assignee: Brother Kogyo Kabushiki Kaisha, Nagoya (JP)

( * ) Notice: Subject to any disclaimer, the term of this patent is extended or adjusted under 35 U.S.C. 154(b) by 79 days.

(21) Appl. No.: 17/817,702

(22) Filed: Aug. 5, 2022

(65) Prior Publication Data

US 2022/0371326 A1 Nov. 24, 2022

Related U.S. Application Data

(63) Continuation of application No. PCT/JP2021/005650, filed on Feb. 16, 2021.

(30) Foreign Application Priority Data

Feb. 20, 2020 (CN) ......................... 202020189615.4

(51) Int. Cl.
*B41J 2/175* (2006.01)

(52) U.S. Cl.
CPC ....... *B41J 2/17523* (2013.01); *B41J 2/17553* (2013.01)

(58) Field of Classification Search
CPC ...... B41J 2/01; B41J 2/17509; B41J 2/17553; B41J 29/13
See application file for complete search history.

(56) References Cited

U.S. PATENT DOCUMENTS

| | | | | |
|---|---|---|---|---|
| 6,039,428 | A | 3/2000 | Juve | |
| 6,578,940 | B2 * | 6/2003 | Rehmann | B41J 2/04581 370/284 |
| 2004/0021712 | A1 * | 2/2004 | Yamamoto | B41J 2/17566 347/7 |

(Continued)

FOREIGN PATENT DOCUMENTS

| | | |
|---|---|---|
| JP | 2019-098526 A | 6/2019 |
| JP | 2019-119061 A | 7/2019 |

(Continued)

OTHER PUBLICATIONS

English translation of the International Preliminary Report on Patentability (Chapter I) dated Aug. 23, 2022 (Application No. PCT/JP2021/005650).

(Continued)

*Primary Examiner* — Anh T Vo
(74) *Attorney, Agent, or Firm* — Element IP, PLC

(57) ABSTRACT

A monochrome inkjet printer used only for monochrome recording includes a first ink reservoir configured to accommodate dye ink, a first recording head communicating with the first ink reservoir and configured to record an image using the dye ink, a second ink reservoir configured to accommodate pigment ink, and a second recording head communicating with the second ink reservoir and configured to record an image using the pigment ink. At least one of the first ink reservoir and the second ink reservoir includes an ink injection port compatible with an ink bottle.

6 Claims, 6 Drawing Sheets

(56) References Cited

U.S. PATENT DOCUMENTS

| | | | | |
|---|---|---|---|---|
| 2005/0219309 | A1* | 10/2005 | Uchida | B41J 2/16532 347/30 |
| 2017/0326882 | A1* | 11/2017 | Okude | B41J 2/17506 |
| 2018/0170064 | A1 | 6/2018 | Higuchi et al. | |
| 2020/0316952 | A1 | 10/2020 | Muraoka et al. | |
| 2021/0053355 | A1* | 2/2021 | Usuda | B41J 2/17509 |
| 2021/0060958 | A1* | 3/2021 | Yashiro | B41J 2/17506 |

FOREIGN PATENT DOCUMENTS

| | | | |
|---|---|---|---|
| JP | 2019-142239 | A | 8/2019 |
| JP | 2020-168832 | A | 10/2020 |

OTHER PUBLICATIONS

International Search Report (with English translation) and Written Opinion, International Application No. PCT/JP2021/005650 dated Apr. 27, 2021 (10 pages).

* cited by examiner

MONOCHROME INKJET PRINTER

REFERENCE TO RELATED APPLICATIONS

This is a Continuation of International Application No. PCT/JP2021/005650 filed on Feb. 16, 2021, which claims priority from Chinese Utility Model Application No. 202020189615.4 filed on Feb. 20, 2020. The entire disclosures of the prior applications are incorporated herein by reference.

BACKGROUND ART

The present disclosure relates to the field of inkjet printers, and more specifically to monochrome inkjet printers.

FIG. 1 shows a conventional inkjet printer 1. The inkjet printer 1 performs image recording by ejecting ink from a recording head 90 toward a recording medium (e.g., a recording sheet).

In order to facilitate understanding of the following description, a side of an inkjet printer facing a user at a position for using the inkjet printer is defined as "front," a side opposite thereto is defined as "rear," the left-hand side of the user is defined as "left", the right-hand side of the user is defined as "right," and a direction perpendicular to the front-rear and left-right directions is defined as "up/down direction."

As illustrated in FIG. 1, the inkjet printer 1 includes a housing 60. The housing 60 includes a lower housing 61 and an upper housing. The upper housing is positioned above the lower housing 61 and is fixedly connected to the lower housing 61. A discharge port 62 is provided on a front surface of the lower housing 61. After the recording head 90 completes image recording on a recording medium, the recording medium is discharged via the discharge port 62.

Five ink reservoirs are provided in the front side of the lower housing 61, namely, a first ink reservoir 55*a* used to accommodate black dye ink, a second ink reservoir 55*b* used to accommodate cyan ink, a third ink reservoir 55*c* used to accommodate yellow ink, a fourth ink reservoir 55*d* used to accommodate magenta ink, and a fifth ink reservoir 55*e* used to accommodate black pigment ink, in order from left to right.

The front side of the lower housing 61 is provided with viewing windows corresponding to the above-described five ink reservoirs, namely, a first viewing window 57*a* corresponding to the first ink reservoir 55*a*, a second viewing window 57*b* corresponding to the second ink reservoir 55*b*, a third viewing window 57*c* corresponding to the third ink reservoir 55*c*, a fourth viewing window 57*d* corresponding to the fourth ink reservoir 55*d*, and a fifth viewing window 57*e* corresponding to the fifth ink reservoir 55*e*, in order from left to right. The above-described viewing windows are formed of a transparent or semi-transparent material, and the amounts and/or colors of ink in the ink reservoirs can be checked through the corresponding viewing windows. The above-described viewing windows may be simple openings.

When the inkjet printer 1 records achromatic colors (i.e., colors including a pure white color, a pure black color, and a series of transitional colors from the pure black color to the pure white color, and having no hue, that is, colors not including any of cyan, yellow, and magenta), the recording head 90 of the inkjet printer 1 records using the black dye ink in the first ink reservoir 55*a* or using the black pigment ink in the fifth ink reservoir 55*e*.

When the inkjet printer 1 is used as a color printer, the recording head 90 records using cyan ink in the second ink reservoir 55*b*, yellow ink in the third ink reservoir 55*c*, and magenta ink in the fourth ink reservoir 55*d*.

DESCRIPTION

When the remaining amount of ink in any one of the five ink reservoirs described above becomes smaller than a prescribed value (i.e., when the remaining amount of ink becomes insufficient), the inkjet printer 1 cannot perform image recording normally. In such a case, if the remaining amount of ink in one or more of the second ink reservoir 55*b*, the third ink reservoir 55*c*, and the fourth ink reservoir 55*d* is insufficient, although a user who wants to perform achromatic recording (i.e., monochrome recording) does not use color inks in the second ink reservoir 55*b*, the third ink reservoir 55*c*, and the fourth ink reservoir 55*d*, the user has to refill the one or more of the second ink reservoir 55*b*, the third ink reservoir 55*c*, and the fourth ink reservoir 55*d*, or the inkjet printer 1 cannot perform the monochrome recording.

In addition, some users want to use inkjet printers only for monochrome recording. Conventional inkjet printers include inkjet printers capable of performing monochrome recording only. Users who want to use inkjet printers only for monochrome recording only need to purchase monochrome inkjet printers capable of performing monochrome recording only.

In view of raw material costs and manufacturing costs, price of dye ink is lower than that of pigment ink. On the other hand, compared with pigment ink, dye ink easily penetrates into the recording medium and thus qualities of images recorded using dye ink tend to degrade. Therefore, dye ink is suitable for users who give priority to low-cost recording than to high-quality recording.

Compared with dye ink, penetrativeness of pigment ink into the recording medium is low. Therefore, recording quality of images and texts recorded using pigment ink are often higher than that of images and texts recorded using dye ink. However, the price of pigment ink is high compared with the price of dye ink. Therefore, pigment ink is suitable for users who give priority to high-quality recording. It should be noted that some of the users who purchase monochrome inkjet printers want to record beautiful texts.

For this reason, manufacturers and the like that manufacture or sell monochrome inkjet printers only manufacture or sell inkjet printers only capable of using pigment ink. Therefore, from the viewpoint of users of monochrome inkjet printers only capable of using pigment ink, monochrome images can only be recorded using pigment ink which is relatively expensive, and it is impossible to record a large amount of images at low cost by using dye ink. Accordingly, at least one aspect of the present disclosure provides a monochrome inkjet printer at least partially capable of solving the above-described problem.

According to aspects of the present disclosure, there is provided a monochrome inkjet printer used only for monochrome recording. The monochrome inkjet printer includes a first ink reservoir configured to accommodate dye ink, a first recording head communicating with the first ink reservoir and configured to record an image using the dye ink, a second ink reservoir configured to accommodate pigment ink, and a second recording head communicating with the second ink reservoir and configured to record an image using the pigment ink. At least one of the first ink reservoir and the second ink reservoir includes an ink injection port compatible with an ink bottle.

With this configuration, a user can perform monochrome recording while taking into account to the characteristics of dye ink and pigment ink.

Furthermore, according to this configuration, there is no risk that the monochrome recording cannot be performed due to the shortage of the remaining amount of ink in the ink reservoir for accommodating color ink.

While description of more specific details in the following description may help a further understanding of aspects of the present disclosure, to avoid confusion with aspects of the present disclosure, descriptions of technical features known in the present technical field are herein omitted.

Embodiments of the present disclosure will be described below with reference to the drawings. In the following description, terms such as "up," "down," and other similar expression are used without limiting the scope of the present disclosure.

In the following description, ordinal numbers such as "first" and "second" used in the present application are merely labels, and thus do not imply that there is no other structure and do not represent a specific order or the like. Moreover, for example, the expression "first member" does not imply the presence of a "second member," and the expression "second member" does not imply the presence of a "first member."

Detailed structures are presented in the following description for completeness of embodiments of the present disclosure. Implementation of embodiments of the present disclosure is not limited to specific details familiar to those skilled in the art. Although better embodiments of the present disclosure are described in detail below, the present disclosure may include embodiments other than those described herein.

First Embodiment

Figure 1:
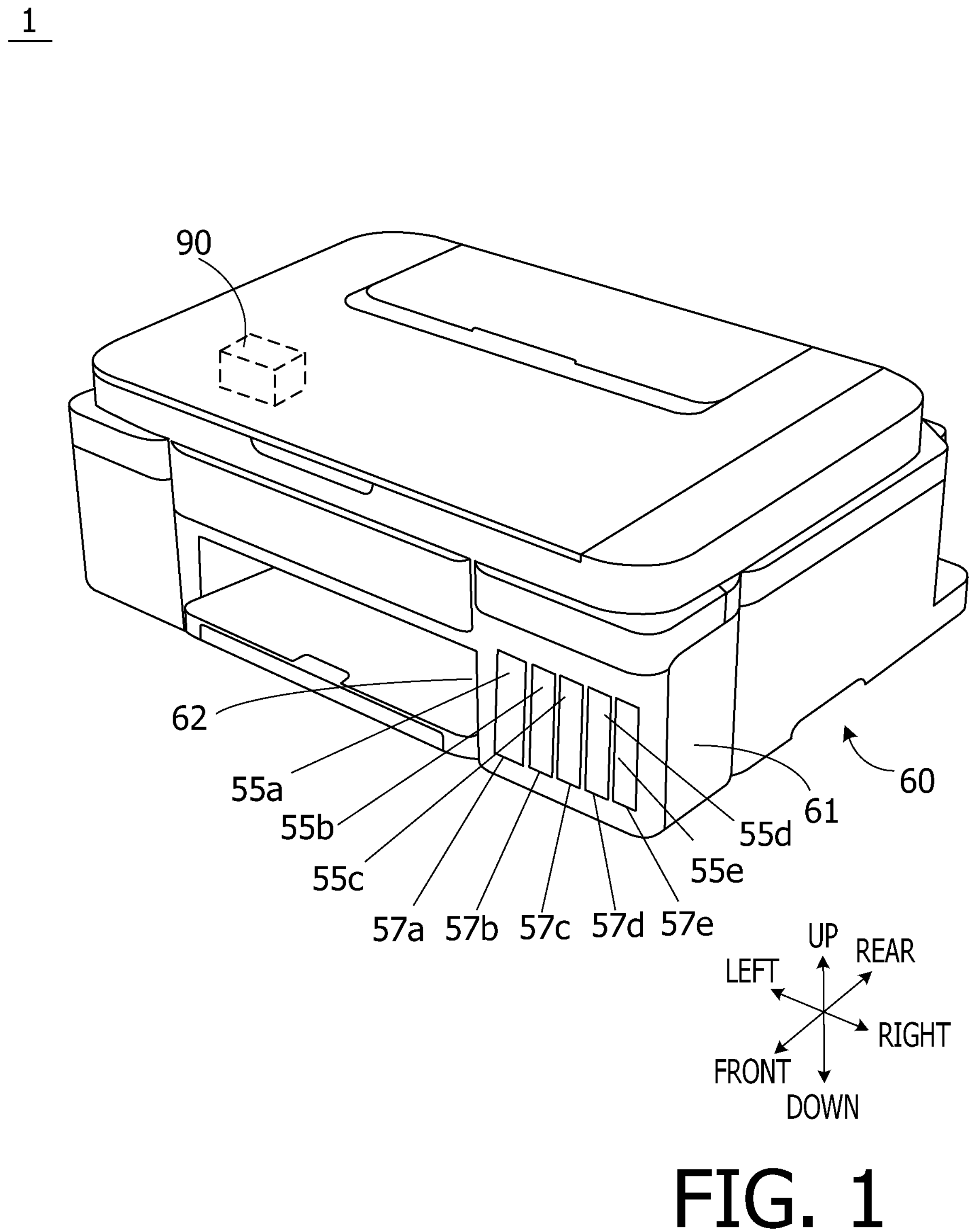
FIG. 1 is a perspective view of a conventional inkjet printer.
Figure 2:
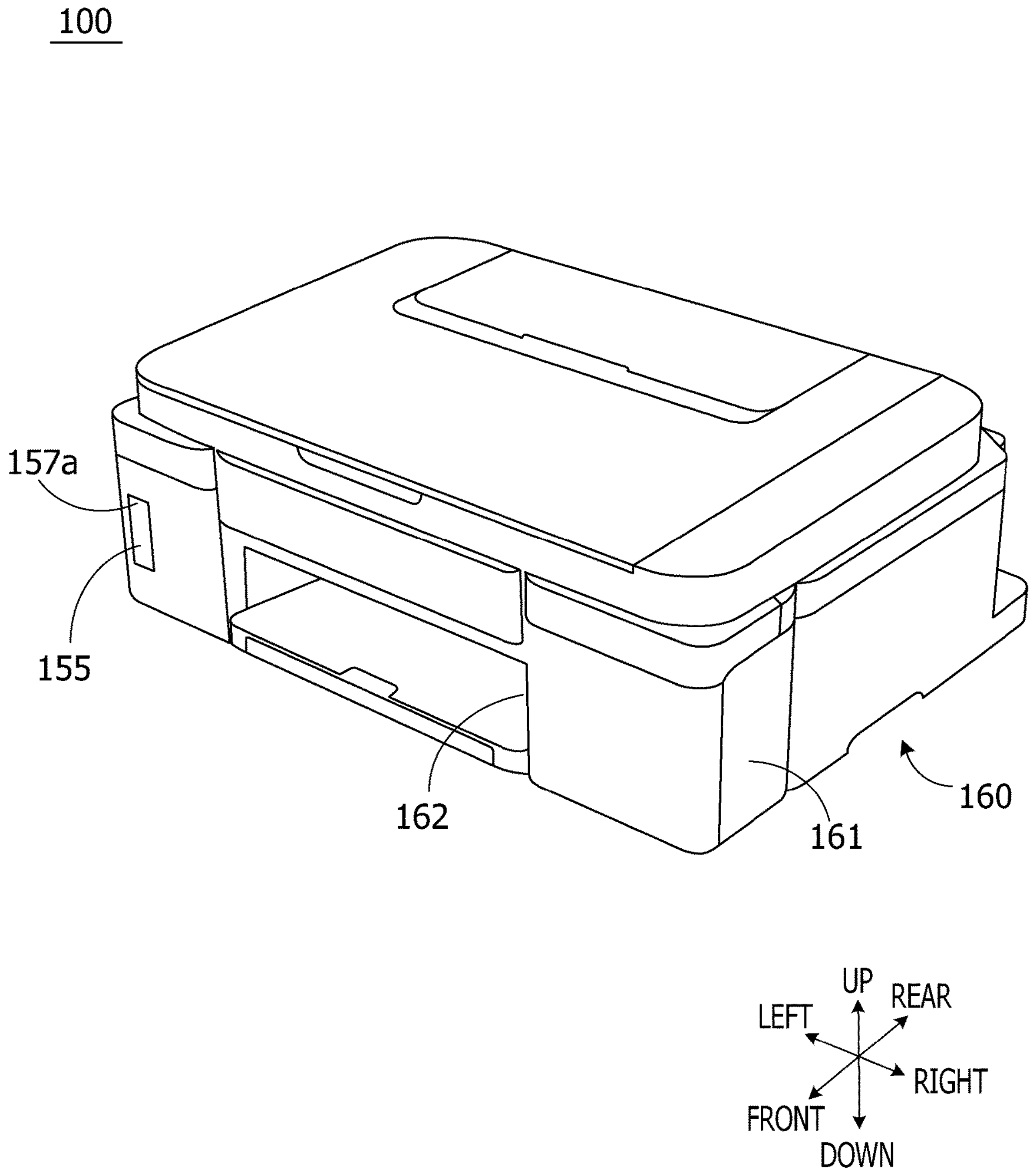
FIG. 2 is a perspective view of a monochrome inkjet printer according to a first embodiment of the present disclosure.
Figure 3:
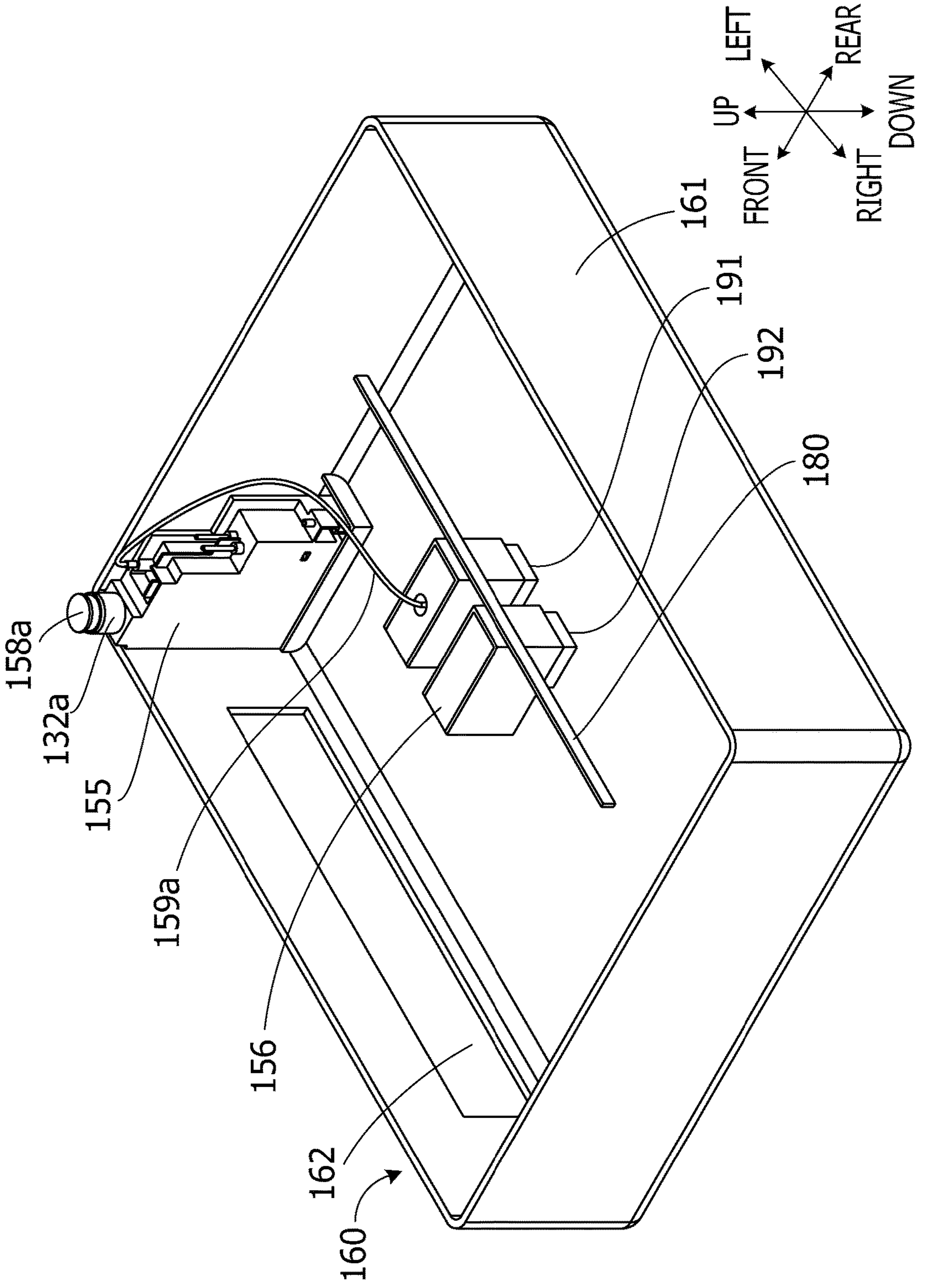
FIG. 3 is a partial perspective view of the monochrome inkjet printer shown in FIG. 2, in which the upper housing is not shown and a some of structures of the lower housing are omitted.
Figure 4:
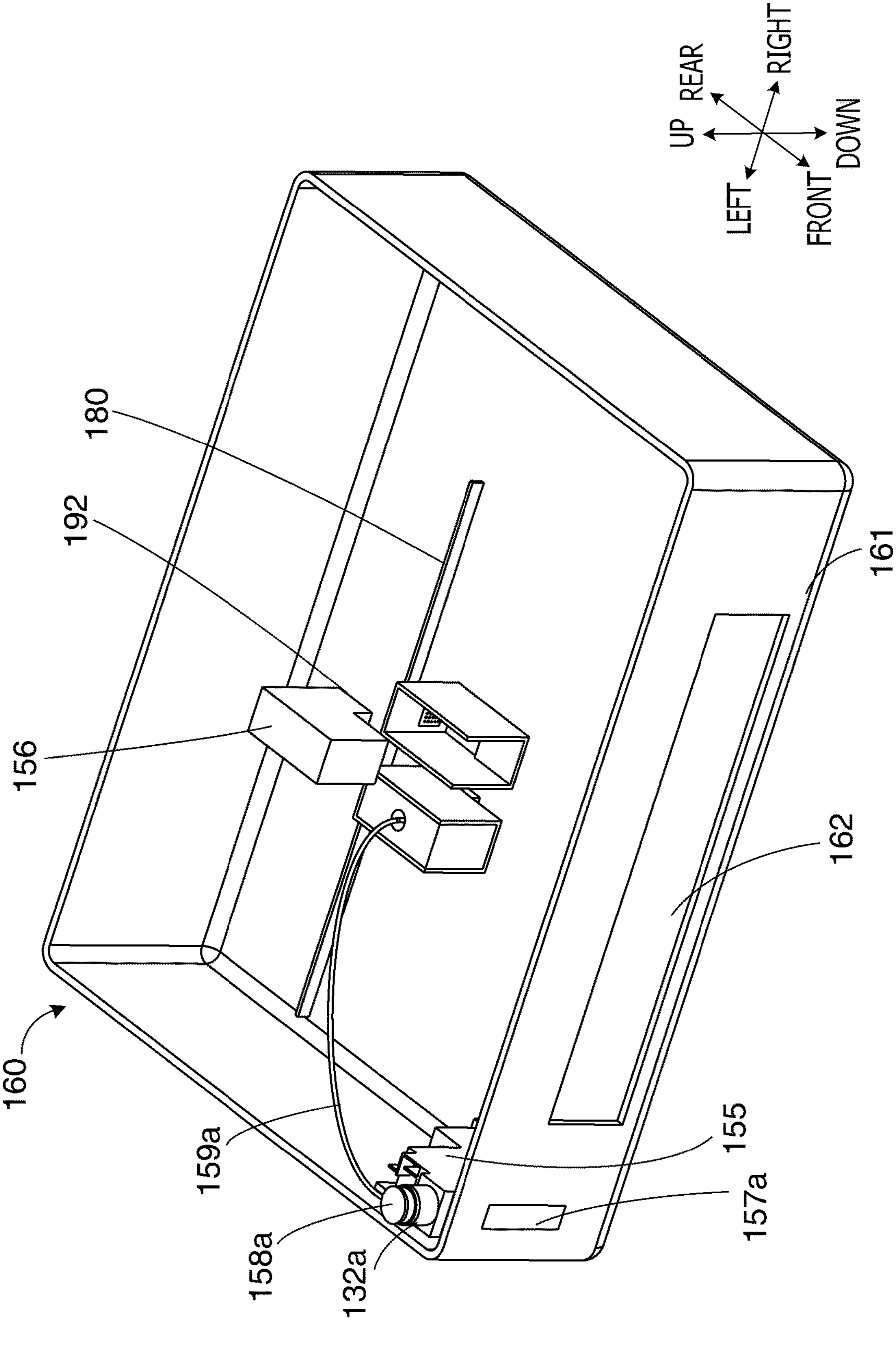
FIG. 4 is another partial perspective view of the monochrome inkjet printer shown in FIG. 2, in which the upper housing is not shown, some of the structures of the lower housing are omitted, and a second ink reservoir and a holding part are separated from each other.

FIGS. 2 to 4 show a monochrome inkjet printer 100 according to the first embodiment of the present disclosure. The monochrome inkjet printer 100 is used only for achromatic recording (i.e., monochrome recording). Achromatic colors are colors including a pure white color, a pure black color, and a series of transitional colors from the pure black color to the pure white color. The achromatic colors have no hue, that is, the achromatic colors do not include any of cyan, yellow, and magenta.

As shown in FIG. 2, the monochrome inkjet printer 100 includes a housing 160. The housing 160 includes a lower housing 161 and an upper housing. The upper housing is positioned above the lower housing 161 and is fixedly connected to the lower housing 161.

As shown in FIGS. 3 and 4, the monochrome inkjet printer 100 includes a first ink reservoir 155 and a first recording head 191. The first ink reservoir 155 and the first recording head 191 are located inside the housing 160, and the first ink reservoir 155 is located at the left front portion of the housing 160. A first viewing window 157*a* corresponding to the first ink reservoir 155 is provided at the left front portion of the lower housing 161.

Although not shown in the first embodiment, the first ink reservoir 155 may be located at the right front portion of the housing 160, and the first viewing window 157*a* corresponding to the first ink reservoir 155 may be provided at the right front portion of the lower housing 161.

The first ink reservoir 155 accommodates dye ink. An internal space of the first ink reservoir 155 and the first recording head 191 communicate with each other through a first tube 159*a*. The first ink reservoir 155 supplies ink to the first recording head 191 through a first tube 159*a*. Thus, the first recording head 191 can record images and texts using the dye ink in the first ink reservoir 155.

As shown in FIGS. 3 and 4, the monochrome inkjet printer 100 further includes a second ink reservoir 156 and a second recording head 192. The second ink reservoir 156 and the second recording head 192 are located inside the housing 160.

The second ink reservoir 156 accommodates pigment ink. Internal spaces of the second recording head 192 and the second ink reservoir 156 communicate with each other, and the second recording head 192 can record images and texts using the ink in the second ink reservoir 156.

In the present embodiment, the second ink reservoir 156 and the second recording head 192 are formed as an integral member. This member has an internal space that forms the second ink reservoir 156, and the second recording head 192 communicates with the internal space.

The monochrome inkjet printer 100 further includes a holding part 180. The first recording head 191 and the second recording head 192 described above are detachably attached to the holding part 180. Therefore, the first recording head 191 and the second recording head 192 may be replaced.

In the embodiment shown in the drawing, the second ink reservoir 156 may be detachably attached to the holding part 180.

The holding part 180 can reciprocate in a first direction (the left-right direction in the drawings). Accordingly, images and texts are recorded on the recording medium as the first recording head 191 and the second recording head 192 provided to the holding part 180 reciprocate in the first direction.

The dye ink may be black ink. In this case, the monochrome inkjet printer 100 can use the dye ink to record monochrome images or texts. The pigment ink may be black ink. In this case, the monochrome inkjet printer 100 can use the pigment ink to record monochrome images or texts.

As shown in FIGS. 3 and 4, the first ink reservoir 155 is provided with a first ink injection port 132*a*. Since a not-shown ink bottle containing the dye ink is adapted to the first ink injection port 132*a*, the dye ink can be supplied to the internal space of the first ink reservoir 155 through the first ink injection port 132*a*.

The monochrome inkjet printer 100 further includes a first ink cap 158*a*. The first ink cap 158*a* is made of a rubber material. The first ink cap 158*a* is detachably attached to the first ink injection port 132*a*. Since the first ink cap 158*a* can seal the first ink injection port 132*a*, it is possible to prevent the ink in the first ink reservoir 155 from flowing out from the first ink injection port 132*a*. When the first ink cap 158*a* is removed from the first ink injection port 132*a*, the ink can be supplied to the internal space of the first ink reservoir 155 through the first ink injection port 132*a*.

In the illustrated embodiment, a capacity of the first ink reservoir 155 is greater than a capacity of the second ink reservoir 156. In the monochrome inkjet printer 100 of the present embodiment, a volume of the accommodated dye ink is greater than a volume of the accommodated pigment ink.

As shown in FIGS. 2 to 4, a discharge port 162 is provided on the front surface of the lower housing 161. After the first recording head 191 and/or the second recording head 192 record images and/or texts on a recording medium, the recording medium is discharged through the discharge port 162.

In the present embodiment, the monochrome inkjet printer 100 includes the first ink reservoir 155 for containing the dye ink and the second ink reservoir 156 for containing the pigment ink, is used only for the monochrome recording, and cannot be used as a color printer. Furthermore, since the monochrome inkjet printer 100 does not include an ink reservoir for accommodating color ink, there is no risk that the monochrome recording cannot be performed due to the shortage of the remaining amount of ink in the ink reservoir for accommodating color ink.

Second Embodiment

Figure 5:
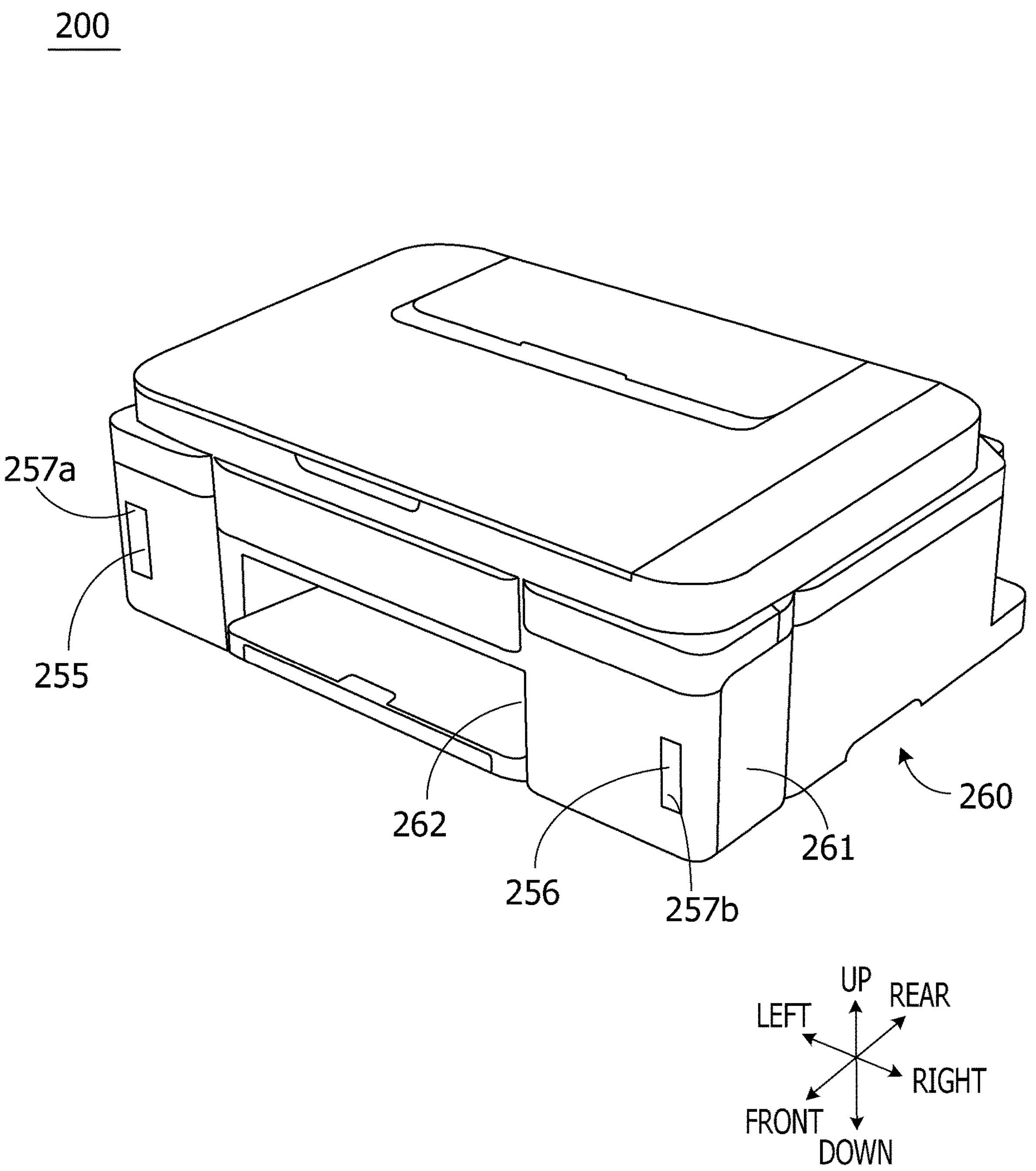
FIG. 5 is a perspective view of a monochrome inkjet printer according to a second embodiment of the present disclosure.
Figure 6:
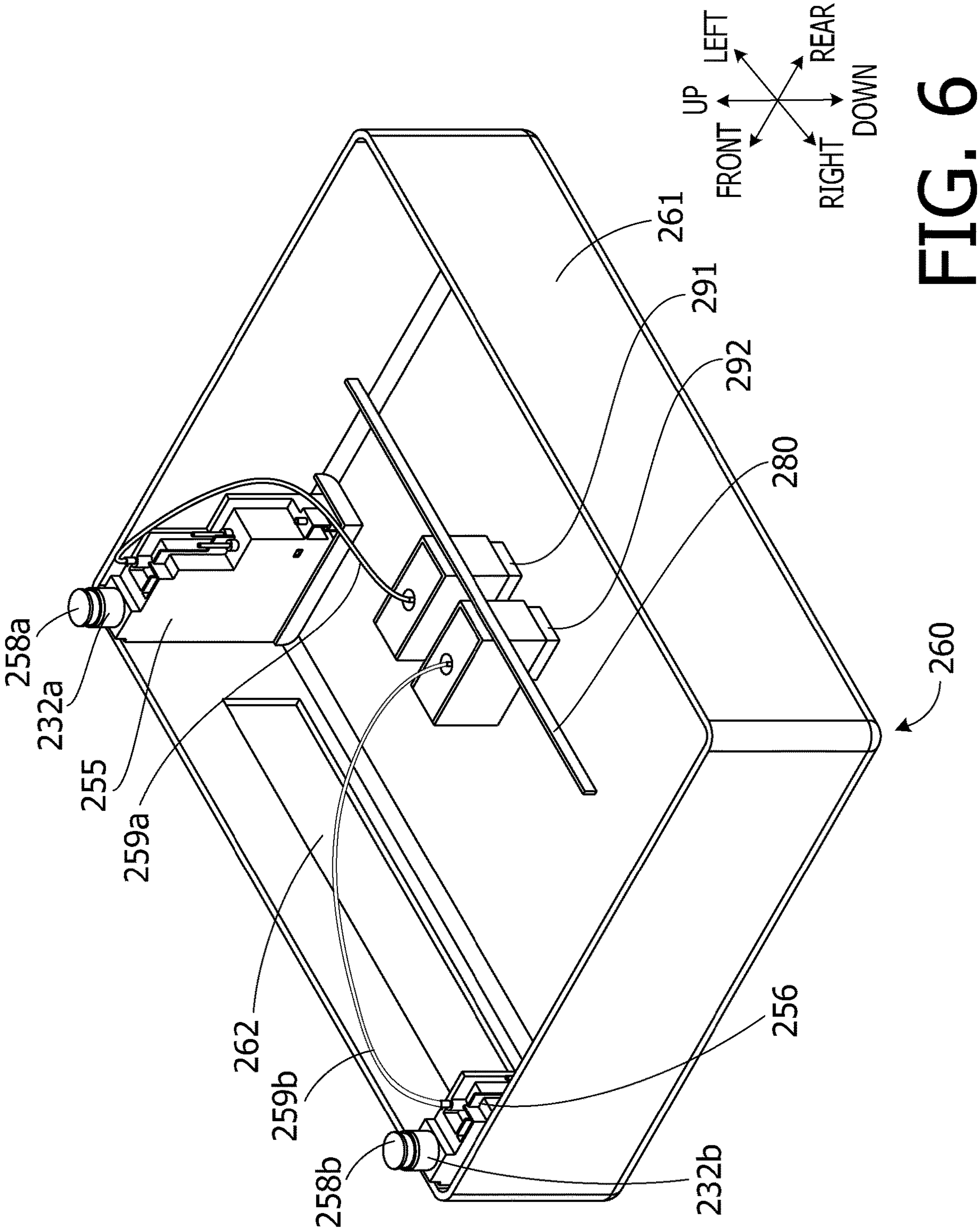
FIG. 6 is a partial perspective view of the monochrome inkjet printer shown in FIG. 5, in which the upper housing is not shown and some of the structures of the lower housing are omitted.

FIGS. 5 and 6 show a monochrome inkjet printer 200 according to a second embodiment of the present disclosure. The monochrome inkjet printer 200 according to the second embodiment has substantially the same structure as the monochrome inkjet printer 100 according to the first embodiment except for configurations of a second ink reservoir 256, a second ink cap 258*b*, and a second viewing window 257*b*. Structures having functions common to those in the first embodiment are denoted by the same reference numerals.

The monochrome inkjet printer 200 includes a housing 260. The housing 260 includes a lower housing 261 and an upper housing. The upper housing is located above the lower housing 261 and is fixedly connected to the lower housing 261.

As shown in FIGS. 5 and 6, the monochrome inkjet printer 200 includes a first ink reservoir 255 and a first recording head 291. The first ink reservoir 255 and the first recording head 291 are located inside the housing 260, and the first ink reservoir 255 is located at the left front portion of the housing 260. A first viewing window 257*a* corresponding to the first ink reservoir 255 is provided at the left front portion of the lower housing 261.

The first ink reservoir 255 accommodates the dye ink. An internal space of the first ink reservoir 255 and the first recording head 291 communicate with each other through a first tube 259*a*. The first ink reservoir 255 supplies ink to the first recording head 291 through the first tube 259*a*. Thus, the first recording head 291 can record images and texts using the dye ink in the first ink reservoir 255.

The monochrome inkjet printer 200 further includes a second ink reservoir 256 and a second recording head 292. The second ink reservoir 256 and the second recording head 292 are located inside the housing 260. The second ink reservoir 256 is located at the right front portion of the housing 260. A second viewing window 257*b* corresponding to the second ink reservoir 256 is provided at the right front portion of the lower housing 261.

The second ink reservoir 256 accommodates pigment ink. An internal space of the second ink reservoir 256 and the second recording head 292 communicate with each other through a second tube 259*b*. The second ink reservoir 256 supplies ink to the second recording head 292 through the second tube 259*b*. Thus, the second recording head 292 can record images and texts using the pigment ink in the second ink reservoir 256.

The monochrome inkjet printer 200 further includes a holding part 280. The first recording head 291 and the second recording head 292 described above are all detachably attached to the holding part 280.

As shown in FIGS. 5 and 6, a discharge port 262 is provided on the front surface of the lower housing 261. After the first recording head 291 and/or the second recording head 292 record images and/or texts on a recording medium, the recording medium is discharged through the discharge port 262. In the illustrated embodiment, the discharge port 262 is positioned between the first ink reservoir 255 and the second ink reservoir 256 in the left-right direction. In other words, the first ink reservoir 255 and the second ink reservoir 256 are positioned on both sides of the discharge port 262 in the left-right direction.

The first ink reservoir 255 is provided with a first ink injection port 232*a* and a first ink cap 258*a* that can be detachably attached to the first ink injection port 232*a*.

The second ink reservoir 256 is provided with a second ink injection port 232*b*. Since a not-shown ink bottle containing pigment ink is adapted to the second ink injection port 232*b*, the ink can be supplied to the internal space of the second ink reservoir 256 though the second ink injection port 232*b*.

The monochrome inkjet printer 200 further includes a second ink cap 258*b*. The second ink cap 258*b* is made of a rubber material. The second ink cap 258*b* is detachably attached to the second ink injection port 232*b*. Since the second ink cap 258*b* can seal the second ink injection port 232*b*, the ink in the second ink reservoir 256 can be prevented from flowing out from the second ink injection port 232*b*. When the second ink cap 258*b* is removed from the second ink injection port 232*b*, the ink can be supplied to the internal space of the second ink reservoir 256 through the second ink injection port 232*b*.

In the present embodiment, a capacity of the first ink reservoir 255 is equal to a capacity of the second ink reservoir 256. In the monochrome inkjet printer 200 of the present embodiment, a volume of contained dye ink is equal to a volume of contained pigment ink.

It should be noted that the capacity of the first ink reservoir 255 may be larger than the capacity of the second ink reservoir 256. It should also be noted that the capacity of the first ink reservoir 255 may be smaller than the capacity of the second ink reservoir 256.

Except for specific definitions, the technical and scientific terms used herein are the same as those commonly understood by those skilled in the art of the present disclosure. The terms used herein are used to describe specific embodiments and are not intended to limit the present disclosure. Terms such as "member" appearing herein may represent a single component or a combination of multiple components. Terms such as "mount" appearing herein indicate that one component is connected directly to another component, but may also indicate that one component is connected to another component via an intermediate component. The features described in one embodiment herein may be applied to another embodiment alone or in combination with other features.

While the invention has been described in conjunction with various example structures outlined above and illustrated in the figures, various alternatives, modifications, variations, improvements, and/or substantial equivalents, whether known or that may be presently unforeseen, may become apparent to those having at least ordinary skill in the art. Accordingly, the example embodiments of the disclosure, as set forth above, are intended to be illustrative of the invention, and not limiting the invention. Various changes may be made without departing from the spirit and scope of the disclosure. Therefore, the disclosure is intended to embrace all known or later developed alternatives, modifications, variations, improvements, and/or substantial equivalents.

What is claimed is:

1. A monochrome inkjet printer used only for monochrome recording, comprising:

a housing;

a holding part;

a first ink reservoir configured to accommodate black dye ink;

a first recording head communicating with the first ink reservoir and configured to record an image using the black dye ink;

a second ink reservoir configured to accommodate black pigment ink; and a second recording head communicating with the second ink reservoir and configured to record an image using the black pigment ink;

wherein:

the first ink reservoir is in contact with the housing, and ink reservoirs other than the first ink reservoir are not in contact with the housing;

the first ink reservoir comprises a first ink injection port compatible with an ink bottle;

the second ink reservoir is detachably attached to the holding part, and ink reservoirs other than the second ink reservoir are not detachably attached to the holding part; and the housing is a different structure from the holding part.

2. The monochrome inkjet printer according to claim 1, wherein a capacity of the first ink reservoir is equal to a capacity of the second ink reservoir.

3. The monochrome inkjet printer according to claim 1, wherein a capacity of the first ink reservoir is larger than a capacity of the second ink reservoir.

4. The monochrome inkjet printer according to claim 1, wherein a capacity of the first ink reservoir is smaller than a capacity of the second ink reservoir.

5. The monochrome inkjet printer according to claim 1, wherein the holding part is configured to reciprocate in a first direction to cause the first recording head and the second recording head to record an image on a recording medium.

6. The monochrome inkjet printer according to claim 1, wherein:

the black dye ink is present in the first ink reservoir; and the black pigment ink is present in the second ink reservoir.

* * * * *